United States Patent [19]

Morando

[11] Patent Number: 5,548,930
[45] Date of Patent: Aug. 27, 1996

[54] VEHICLE DOOR MOUNTING PLATE INTEGRATING SEVERAL FUNCTIONS AND ASSEMBLY METHOD

[75] Inventor: Patrick Morando, Nice, France

[73] Assignee: Mecaplast Sam, Monaco

[21] Appl. No.: 211,136

[22] PCT Filed: Aug. 4, 1992

[86] PCT No.: PCT/FR92/00771

§ 371 Date: Mar. 22, 1994

§ 102(e) Date: Mar. 22, 1994

[87] PCT Pub. No.: WO94/03341

PCT Pub. Date: Feb. 17, 1994

[51] Int. Cl.⁶ .................................................. B60J 5/04
[52] U.S. Cl. ................................... 49/502; 296/146.5
[58] Field of Search ................. 49/502; 296/146.5, 296/146.1, 146.2, 146.7, 146.9

[56] References Cited

U.S. PATENT DOCUMENTS

| | | | |
|---|---|---|---|
| 4,785,585 | 11/1988 | Grier et al. | 49/502 |
| 4,800,638 | 1/1989 | Herringshaw et al. | 49/502 X |
| 4,907,836 | 3/1990 | Ueda et al. | 49/502 X |
| 5,095,659 | 3/1992 | Benoit et al. | |
| 5,226,259 | 7/1993 | Yamagata et al. | 49/502 |
| 5,251,403 | 10/1993 | Compeau et al. | 49/502 |

FOREIGN PATENT DOCUMENTS

| | | |
|---|---|---|
| 0385823 | 9/1990 | European Pat. Off. . |
| 0406034 | 1/1991 | European Pat. Off. . |
| 0427153A2 | 5/1991 | European Pat. Off. . |
| 3104681A1 | 12/1981 | Germany . |

*Primary Examiner*—Jerry Redman
*Attorney, Agent, or Firm*—Nixon & Vanderhye

[57] ABSTRACT

A vehicle door equipment plate incorporating the window winder function and at least one other function is characterized in that it is built into a conventional door structure consisting of a press-formed shell having an outer metal panel connected to an inner metal panel provided with at least two openings separated by a strengthening metal sheet connecting piece placed substantially transversely with respect to a longitudinal direction of the door. One of the openings provides a passage for a window guide element integrated at one end of the equipment plate, the latter being made from moulded plastic. The second opening provides a passage for the section of the equipment plate supporting the window winder function in such a way that the sections of the equipment plate supporting the window winder function and the window guide function are positioned in the same plane within the door shell while at least one section of the equipment plate is mounted external to the shell on the strengthening metal sheet connecting element.

12 Claims, 3 Drawing Sheets

VEHICLE DOOR MOUNTING PLATE INTEGRATING SEVERAL FUNCTIONS AND ASSEMBLY METHOD

BACKGROUND OF THE INVENTION

The present invention concerns a vehicle door mounting plate integrating several functions and a method for assembling said plate.

U.S. Pat. No. 4,882,842 describes a method for simplifying the line-assembling of doors, said method consisting of producing a moulded door interior lining modular panel on which to be fixed are the electrical and mechanical elements, such as the engine, the window crank handle mechanism, the door handles, the handle for activating the lock, the door locking activator, the electric control panel, the internal lamp, the arm rest, the control motor of the rearview mirror and the heating mechanism associated with the rearview mirror, the signal multiplexing unit and the electronic module so as to control the various elements and seats activated electrically.

However, this lining panel has no structural strength for improving the resistance of the assembled door. Moreover, the unit does not include elements, such as the window pane guide and a drive element attached to the bottom of the window pane. Furthermore, at page 7, lines 60 to 62, this patent states that once the lining panel has had its mechanical and electric elements added, it and all the assemblings tested electrically and mechanically may be placed on a test stand. Such an assembly is then hooked onto hooks (9) provided to this effect on the frame of the door and the window crank handle system is then nested in the openings (10) of the drive element of the window pane which is guided during sliding by means of a window pane guide (8) integral with the frame of the door.

Given the fact that the unit of the modular panel covers the surface of the door, the door frame shall firstly have a particular conformation and be able to provide this sufficient rigidity, thus eliminating the usage of a conventional standard door, and secondly the mounting system does not facilitate the linking between the window pane and the drive element of the window pane (11). Moreover, the lining panel only links the various mechanical elements which retain their essential characteristic features and are not integrated in the structure.

It is also known to provide a standard door for a motor vehicle in which a reinforcement frame is mounted on which a pantograph window pane device is pre-assembled, the door hinges and the lock being secured to the latter. The element is then incorporated in the outer frame of a door to which secured are an external sheet and an internal lining panel.

European patent 0 427 153 describes a door with a particular structure formed by one external sheet and one internal sheet, the internal sheet having one opening on the upper portion so that a self-supporting frame, preferably metallic, is connected movably to the internal sheet. This self-supporting frame supports the closing means, the lifting devices and the window pane guiding devices. The lifting means comprise an extension arm which pivots between a downward projection position able to ensure the normal functioning of the window pane, and a folded back position for transporting the self-supporting frame. This self-supporting frame also comprises a guiding device pivoting between a transport position and a functioning position so as to ensure the guiding of the window pane.

Finally, it is also known to provide a door assembly comprising mounted on a main girder the internal door handle, the locking activator, the various ball joint levers and the connection bars, as well as a stiffening flank on the upper edge of the girder so as to ensure protection against theft. However, this device does not comprise any window pane and requires that a large cut be made to the door so as to enable it to be mounted, which adversely affects the stiffness of the door body during the production operations and the intermediate storage with a view to assembling.

SUMMARY OF THE PRESENT INVENTION

A principal object of the invention is to provide a door mounting plate integrating several functions, this mounting plate being adapted to a door having a conventional structure in which the door body is formed of an external metallic sheet associated integrally with an internal metallic sheet constituting a shell providing the door with sufficient rigidity so as to bear the elements of the door and the frame surrounding the window pane.

This object is attained by providing vehicle door mounting plate which integrates the window pane function and at least one other function and which is characterized in that it is incorporated in a door with a conventional structure constituted by a drawn shell formed of one external metallic panel connected to an internal metallic panel cut in such a way as to have at least two openings separated by a stiffening sheet metal link disposed mainly transversely with respect to a longitudinal direction of the door, one of the openings allowing for the passage of a window pane guide element, this element being integrated with one end of the mounting plate made of a moulded plastic material, the second opening allowing for the passage of the mounting plate portion supporting the window pane function so that the mounting plate portions constituting the window pane function and the windown pane guiding function are situated inside a given plane inside the shell, whereas at least one portion of the mounting plate is mounted outside the shell on the stiffening metal link.

According to another aspect of the present invention, the mounting plate portion constituting the window panel function is formed of a moulded transverse girder and is disposed mainly transversely with respect to one main direction of the mounting plate constituted in particular by a single main girder, the window pane guide function being disposed at one end of the main girder.

According to another aspect, the girder comprises at the end opposite the one comprising the window pane guide function a support enabling a lock mechanism to be fixed.

According to another aspect, the support comprises an upward protuberance constituting a guide for the rod of the door closing indicator button.

According to another aspect, the main girder comprises, between the window panel guide and the window crank handle, an upwards protuberance forming a housing for the internal handle mechanism for controlling the opening of the door, the housing comprising perforations for receiving a swivel pin for the handle and being provided with a light allowing for the passage of the control rod connecting the internal handle to the lock mechanism.

According to another aspect, the girder comprises close to the end supporting the window panel guide a protuberance orientated downwards and intended to form a housing for receiving a loud speaker.

According to another aspect, the ends of the transverse girder constitute housings for the swivel pins of pulleys mounted at each end of the transverse girder so as to constitute the guiding elements of a cable for driving a window crank handle U-clip mounted sliding on one of the longitudinal elements of the transverse girder.

According to another aspect, the longitudinal element of the girder comprises a lip forming a square under which a pad is able to slide connected to the window crank handle U-clip.

According to another aspect, the main girder comprises a recess allowing for the mounting of the electric motor for driving a pulley for activating the cable.

According to another aspect, the girder comprises a throat allowing for the placing of a bundle of conductors intended to transmit the electric signals to the window crank handle motor, the electric lock and the loud speaker.

According to another aspect, the mounting plate is mounted on the internal metallic sheet of the door by means of fixing screws situated close to the points integrating the mechanical elements bearing the stresses.

According to another aspect, the window pane guide is secured at its ends to the door.

According to another aspect, the transverse girder for supporting the window crank handle carriage is fixed close to the two ends bearing the return pulleys.

According to another aspect, the mounting plate is also fixed close to the housing receiving the handle for activating the door opening and closing mechanism.

Another object of the invention is to provide a method for mounting the mounting plate according to one of the preceding aspects.

This objective is attained by the fact that the method for mounting a mounting plate according to one of the preceding aspects comprises the steps of:

sliding the end of the window pane guide and window crank handle girder under the openings of the internal drawn metallic panel by positioning the rest of the mounting plate on the corresponding form provided to this effect on the link of the internal panel;

securing the window pane guide, the window crank handle girder, the support portion of the activation handle and the loud speaker support to the internal panel by means of screws placed close to the stress points;

BRIEF DESCRIPTION OF THE DRAWING FIGURES

Other characteristics and advantages of the present invention shall appear more clearly from a reading of the following description with reference to the accompanying drawings on which:

DESCRIPTION OF A PREFERRED EMBODIMENT

Figure 2:
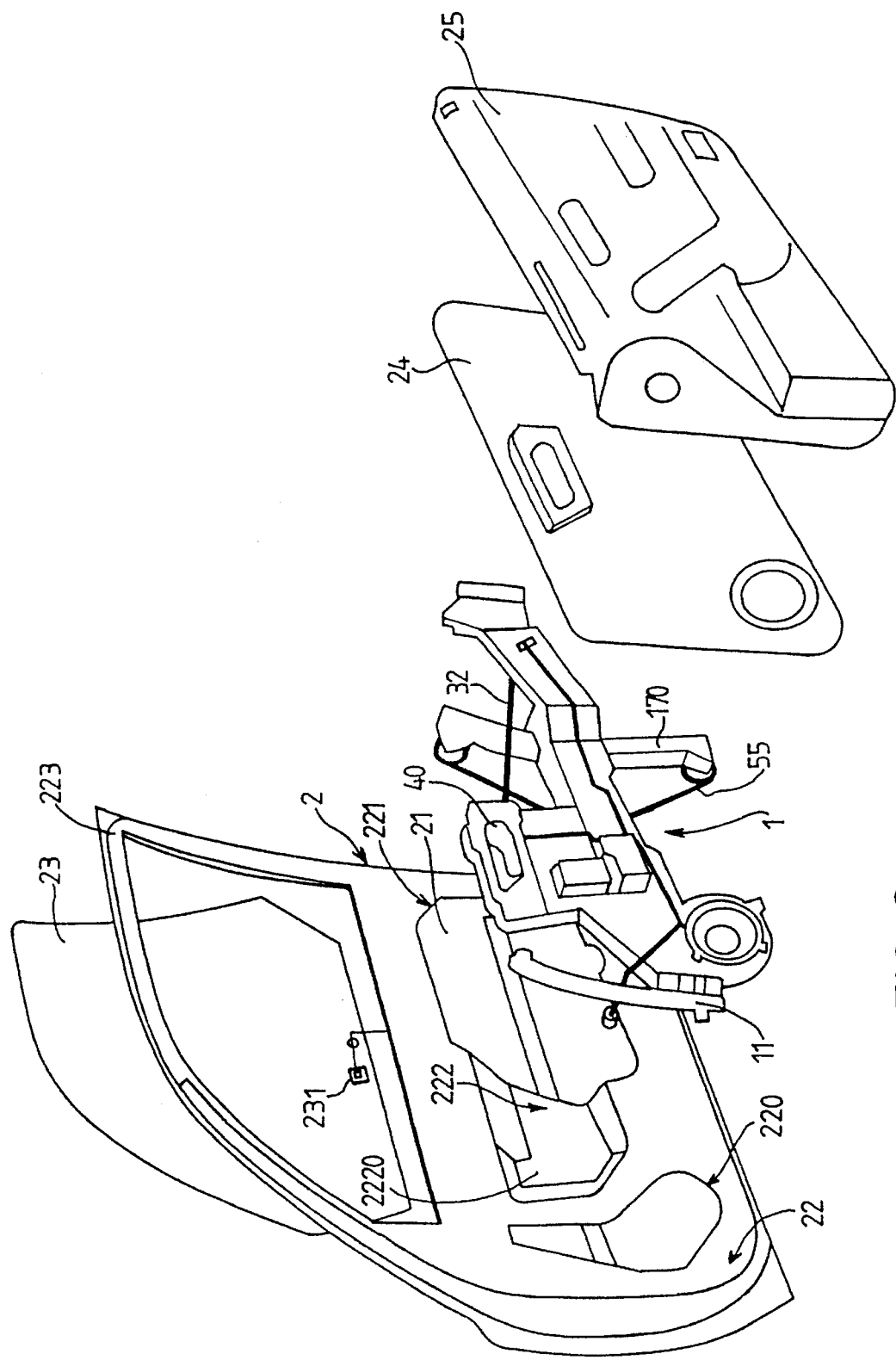
FIG. 2 shows an exploded perspective view on the door on which the door mounting plate is mounted, as well as the internal lining elements of this door.
Figure 4:
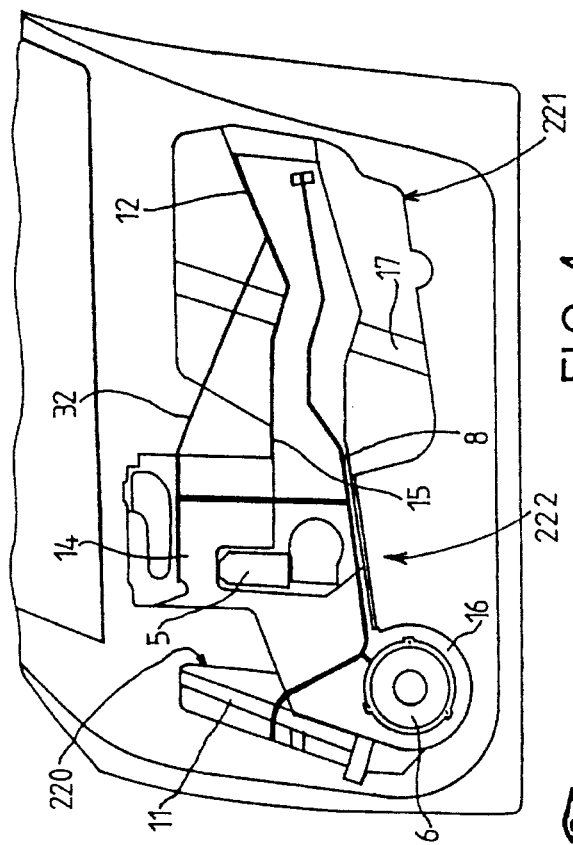
FIG. 4 shows a front view of the mounting plate mounted inside a conventional door according to the invention.

The door mounting plate of the invention comprises a moulded plastic element (1) forming a main girder (1b) at the end of which a window pane guide element (11) is formed with a U-shaped section, the legs of the U-shaped section being orientated parallel to the outer flank of the vehicle door shown on FIG. 2. The vehicle door is a standard conventional door and formed of a metallic sheet (21) constituting the outer casing of a shell, this outer casing (21) being rendered integral with an internal casing (22) thus forming the body shell or body which extends upwards by means of a frame (223) for receiving the window pane (23). The internal steel plate (22) comprises two openings (220, 221) separated by a stiffening link (222) in which inward bosses or recesses (2220) are made so as to conform to the shape of the mounting plate portion to be mounted at the location. The window pane guide element (11) is offset with respect to the plane of the girder (15) towards the rear of FIG. (1) and is connected to the plane of this girder (15) by a joint (116). This main girder (154) extends downwards and close to the window pane element (11) by means of a protuberance (16) comprising a housing (160 intended to receive a loud speaker (6). This protuberance (16) comprises at least one perforation (161) for receiving a screw for fixing the mounting plate to the internal steel sheet.

Similarly, the window pane guide (11) comprises at each of its ends brackets (111, 112) each pierced by a threaded hole enabling a fixing screw to be placed for keeping the window pane guide ends on the internal sheet (22) of the door body.

The main girder (15) comprises at the end opposite the window pane guide (11) an element (170) constituting a transverse girder (170) whose section is mainly formed by a parallelpiped (1700) which extends on one side by a lip (1701) situated in the extension of one of the sides of the parallelpiped perpendicular to the girder (15). Perpendicular to this lip (1701) and on the side opposite the parallelpiped is a lip (1702) connected to this opposing side so as to thus form a square on which a parallelpiped-shaped window crank mechanism U-clip 73 slides and comprising at its center a square-shaped throat adapted to match the shape of the lip (1702).

Screws (76) associated with springs (77) press on the longitudinal side of the girder (170) so as to keep the U-clip (73) in support along the same reference face of the girder (170).

A dowel pin (74) mounted on the U-clip (73) enables fixing of the window pane (23) through an orifice (231, FIG. 2) provided on the window pane (23) which is kept integral with the dowel pin (74) by means of a circlip washer (75). The U-clip (73) is translation-driven along the tranverse girder (170) by a cable (55) passing around pulleys (71, 72) mounted at the ends of the girder (170) on protuberances (171, 172) offset laterally with respect to the guiding surface (1702) so as to allow for the maximum sliding of the U-clip.

The pulleys (71, 72) are mounted on swivel pins disposed in perforations (1710, 1720) which open onto the other face via threaded holes used as points for fixing the fixing screws of the ends of the transverse girder on the internal steel sheet (22) of the door body.

The cable (55) is wound around a transmission pulley (54) mounted pivoting on the central portion (15) of the girder, this intermediate pulley being driven by a progressive gearing system formed of elements (53, 51, 52) and whose spindle (51) transmits the drive movement through the girder (15) by the back-geared motor (5). The back-geared motor unit (5) is mounted in a recess (150 forming the housing for this unit.

The U-clip carriage (73) is mainly located inside the plane of the window pane guide element (11) and the unit is located inside the plane of the frame (223) and in particular of the internal lining (2333) for guiding the window pane (23) into the frame (223).

Figure 1:
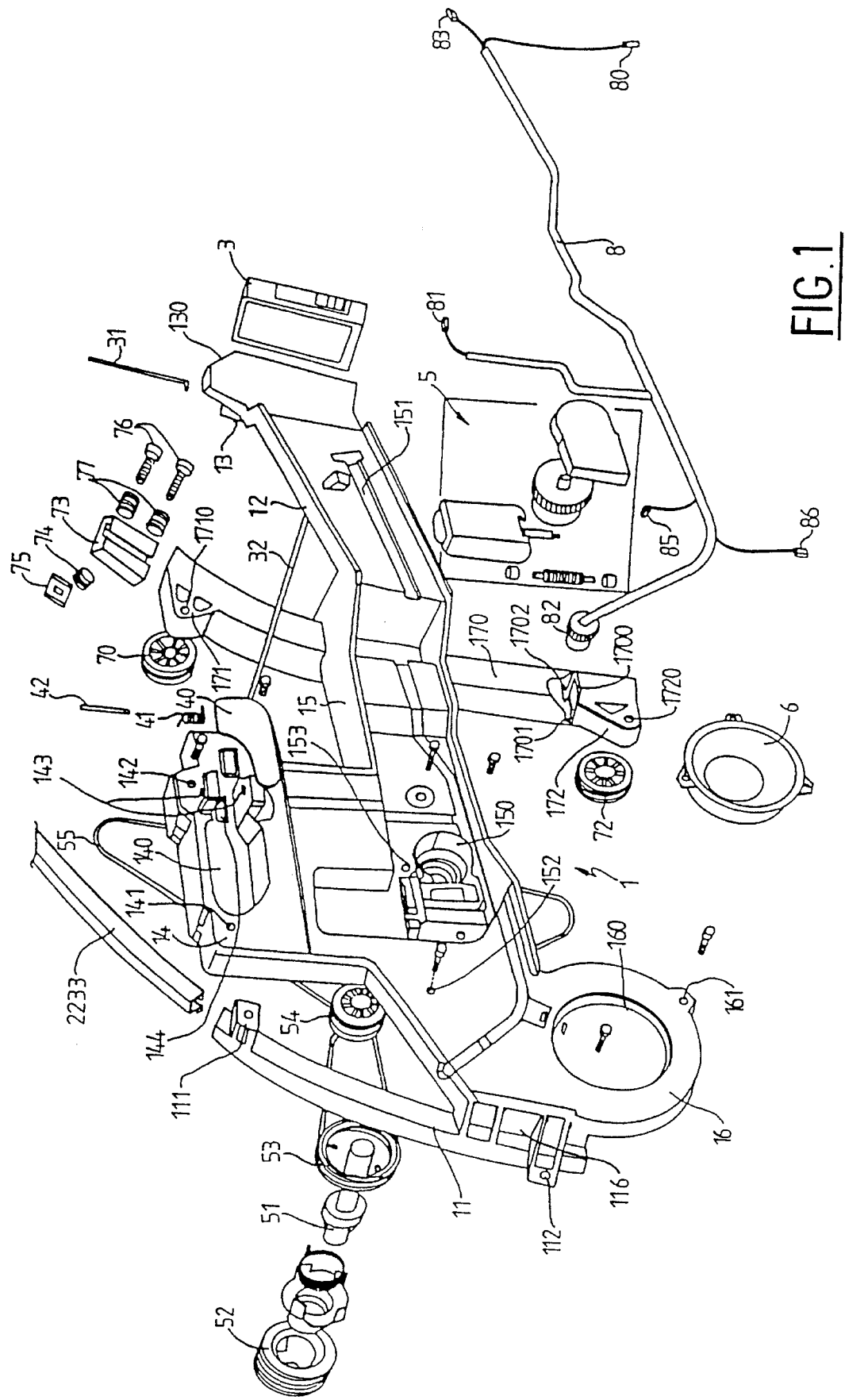
FIG. 1 shows an exploded perspective view of the door mounting plate integrating several functions according to the invention.
Figure 3:
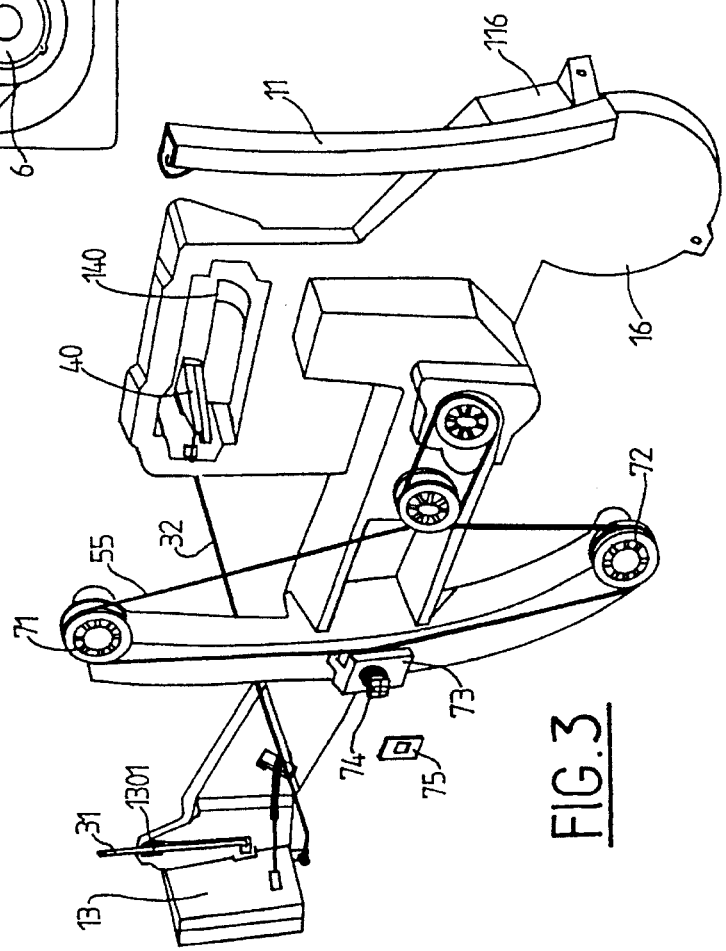
FIG. 3 shows a perspective view of the mounting plate of the invention viewed from the other side with respect to FIG. 1.

On the girder (15) between the window pane guide element (11) and the transverse girder (14), a protuberance is formed on the girder (15) and orientated upwards and comprising a housing (140) intended to receive the handle (40) for activating the internal door opening mechanism. This handle (40) is mounted with the aid of a spindle (42) and a recall spring (41) in the perforations (143) made in the housing (140). The handle (40) extends from the other side of the housing (140) visible on FIG. 3 by a protuberance which passes into a lamp (144) and on which the rod (32) is fixed for activating the door lock mechanism (12) of the main girder (15) constituted by the extension (12) and a portion (13) perpendicular to this extension (12) orientated towards the inside of the door body so as to be situated mainly opposite the girder (15). The extension (12) of the main girder (15) is located inwardly of a offset plane inside the car interior with respect to the main girder (15), as shown on FIG. 1.

The perpendicular surface (13) allows for fixing of the box (3) comprising the door lock mechanism to which the door opening control rod (32) is connected. A rod (31) with a door locking indicator light which passes into an orifice (1301) made in a protuberance (130) of the door extension (12, 13) is also connected to the door lock mechanism.

Finally, the door comprises a throat or groove (151) circulating along the main girder and the extension (12). This throat branches away towards the upper protuberance (14) and towards the lower protuberance (16) so as to allow for the passage of the conductor bundle (8) which makes it possible for the connector (86) to connect the loud speaker (6), the connector (81) to connect the control buttons of the electric window crank handle, the connector (83) to electrically order door locking, the connector (80) to transmit the signals for switching on the door lights and the connector (82) for receiving the control signals originating from the electric installation of the vehicle.

Thus, by integrating in a moulded plastic structure all the functions located inside a door body, an assembly has been embodied which may be pre-assembled and mounted on doors with a conventional body without modifying the structure of the doors so that these bodies have sufficient rigidity during storage periods, thus avoiding the deformation of the doors and then at the time of use of mounting so as to avoid the definition of doors having particular reinforcements so as to be adapted to a mounting plate, such as the one disclosed in the U.S. Pat. No. 4,882,842.

After having been prepared, the mounting plate of the invention is introduced into the door by making the upper ends of the window pane element (11) and the transverse girder (170) respectively penetrate through the opening (220) and the opening (221) respectively. Then, by making the mounting plate pivot slightly, the lower end (172) of the transverse girder (170) is made to penetrate.

Once the window pane elements (11) and the transverse girder (170) have been introduced inside the door body, the window pane (23) is assembled on the window crank U-clip (73) and the mounting plate is fixed by the fixing points which are located close to the ends supporting the main stresses so as to render these elements integral with the lower steel plate of the door. When the lower mounting plate is fixed to the door and the window pane mounted, a covering sheet (24) is secured to the internal steel plate (221) and the entire unit is covered with the internal lining (25).

Thus, it can be readily understood that a moulded unit with easy mounting has been embodied without modifying the structure of the door and, by means of the central link (22) provided with bosses (2220), provides it with sufficient rigidity reinforced by the shapes of the boss (2220).

Any modification able to be made by experts in this field also forms part of the invention.

I claim:

1. A vehicle door comprising:
a door frame having an outer panel connected to an inner panel, said inner panel having first and second openings separated longitudinally from one another by a stiffening link extending generally transversely relative to a longitudinal direction of the door, a generally longitudinally extending mounting plate formed of plastic material and having a portion carrying a window movement mechanism, said first inner panel opening enabling passage therethrough of a window pane guide element carried at one end of said mounting plate, said window movement mechanism and said second inner panel opening being sized and dimensioned relative to one another to enable said window movement mechanism to pass through said second inner panel opening of said mounting plate so that said window movement mechanism and the window pane guide element are situated between said inner and outer door panels, with at least one portion of said mounting plate extending outside of said inner panel and along said stiffening link.

2. A vehicle door according to claim 1 wherein said mounting plate portion carrying said window movement mechanism comprises an elongated transverse girder disposed substantially transversely with respect to said mounting plate, said mounting plate comprising a substantially longitudinally extending girder mounting at one end thereof said window pane guide element.

3. A vehicle door according to claim 2 wherein said longitudinally extending girder comprises at an end opposite said one end a support for carrying a lock mechanism.

4. A vehicle door according to claim 3 wherein said support comprises an upwardly extending protuberance comprising a guide for a rod of a door closing indicator light button.

5. A vehicle door according to claim 2 wherein said longitudinally extending girder comprises between said window pane guide element and said window movement mechanism a protuberance forming a housing for an internal handle mechanism for opening the door, said housing comprising an opening for receiving a swivel pin of a handle.

6. A vehicle door according to claim 2 wherein the end of said longitudinally extending girder supporting said window pane guide element carries a protuberance forming a housing for receiving a loudspeaker.

7. A vehicle door according to claim 2 wherein ends of said transverse girder comprise housings, pulleys carried at each end of said housings, respectively, for receiving a drive cable, a window crank handle clip slidably mounted on said transverse girder and coupled to said drive cable for movement along said transverse girder.

8. A vehicle door according to claim 7 wherein said longitudinally extending girder has a longitudinal element comprising a lip for slidably mounting said window crank handle clip.

9. A vehicle door according to 2 wherein said longitudinally extending girder includes a recess, an electric motor mounted in said recess for driving said pulleys to activate said cable.

10. A vehicle door according to claim 2 wherein said longitudinally extending girder includes a groove enabling placement of a bundle of electrical conductors therein for transmitting electrical signals.

11. A vehicle door according to claim 2 including fixing screws for mounting said mounting plate on said inner panel.

12. A vehicle door according to claim 11 wherein said window pane guide element is secured at its ends to said door.

* * * * *